(12) United States Patent
Livny et al.

(10) Patent No.: US 10,944,791 B2
(45) Date of Patent: Mar. 9, 2021

(54) INCREASING SECURITY OF NETWORK RESOURCES UTILIZING VIRTUAL HONEYPOTS

(71) Applicant: Microsoft Technology Licensing, LLC, Redmond, WA (US)

(72) Inventors: Yotam Livny, Gadera (IL); Mathias Abraham Marc Scherman, Tel Aviv (IL); Moshe Israel, Herzelia (IL); Ben Kliger, Ramat Gan (IL); Ram Haim Pliskin, Rishon Lezion (IL); Roy Levin, Haifa (IL); Michael Zeev Bargury, Ramat Gan (IL)

(73) Assignee: Microsoft Technology Licensing, LLC, Redmond, WA (US)

( * ) Notice: Subject to any disclaimer, the term of this patent is extended or adjusted under 35 U.S.C. 154(b) by 219 days.

(21) Appl. No.: 16/113,196

(22) Filed: Aug. 27, 2018

(65) Prior Publication Data

US 2020/0067980 A1 Feb. 27, 2020

(51) Int. Cl.
*H04L 29/06* (2006.01)
*G06N 20/00* (2019.01)
*G06N 3/08* (2006.01)

(52) U.S. Cl.
CPC ........... *H04L 63/1491* (2013.01); *G06N 3/08* (2013.01); *G06N 20/00* (2019.01); *H04L 63/1416* (2013.01); *H04L 63/1433* (2013.01)

(58) Field of Classification Search
USPC ........................................................ 726/23
See application file for complete search history.

(56) References Cited

U.S. PATENT DOCUMENTS

| | | | |
|---|---|---|---|
| 9,516,053 B1* | 12/2016 | Muddu | H04L 43/08 |
| 2016/0323300 A1 | 11/2016 | Boss et al. | |
| 2017/0223052 A1* | 8/2017 | Stutz | H04L 63/1433 |
| 2018/0020018 A1* | 1/2018 | Walheim | G06F 21/577 |

(Continued)

OTHER PUBLICATIONS

Copeland, "Identifying Risk Profiles and Mitigating Actions for Business Communication Services", ISBN 978-3-901882-67-8, 10th CNSM and Workshop © 2014 IFIP, CNSM Mini-Conference Paper, pp. 236-241 (Year: 2014).*

(Continued)

*Primary Examiner* — Khalil Naghdali
(74) *Attorney, Agent, or Firm* — Newport IP, LLC; Jacob P. Rohwer

(57) ABSTRACT

A system for predicting vulnerability of network resources is provided. The system can calculate an initial vulnerability score for each of the network resources and use the initial vulnerability scores along with activity data of the network resources to train a vulnerability model. After training, the vulnerability model can predict the vulnerability of the network resources based on new activity data collected from the network resources. Based on the predicted vulnerability, vulnerable network resources can be identified. Further analysis can be performed by comparing the activities of the vulnerable network resources and other network resources to identify activity patterns unique to the vulnerable network resources as attack patterns. Based on the attack patterns, one or more actions can be taken to increase the security of the vulnerable network resources to avoid further vulnerability.

20 Claims, 6 Drawing Sheets

(56) References Cited

U.S. PATENT DOCUMENTS

| | | |
|---|---|---|
| 2018/0091540 A1 | 3/2018 | Solow et al. |
| 2019/0073335 A1* | 3/2019 | Foley ................. G06Q 30/0601 |
| 2019/0206090 A1* | 7/2019 | Ray ...................... G06F 12/023 |
| 2019/0236661 A1* | 8/2019 | Hogg .................. H04L 63/1433 |
| 2019/0258807 A1* | 8/2019 | DiMaggio .............. G06N 20/00 |

OTHER PUBLICATIONS

Hussein, "Data Security Analysis for DDoS Defense of Cloud Based Networks", 2015 IEEE Student Conference on Research and Development (SCOReD), pp. 305-310 (Year: 2015).*

"International Search Report and Written Opinion Issued in PCT Application No. PCT/US2019/039670", dated Oct. 1, 2019, 14 Pages.

Qassrawi, et al., "Deception Methodology in Virtual Honeypots", In Proceedings of Second International Conference on Networks Security, Wireless Communications and Trusted Computing, Apr. 24, 2010, pp. 462-467.

Ayenson, et al., "Cloud Vulnerability Assessment", In Project Report of Worcester Polytechnic Institute, Apr. 26, 2012, pp. 1-63.

* cited by examiner

INCREASING SECURITY OF NETWORK RESOURCES UTILIZING VIRTUAL HONEYPOTS

BACKGROUND

Computer security is an important aspect of a computer system, especially in the Internet age. It is very hard, if not impossible, to keep a computer that is connected to the Internet completely secure. Moreover, as cloud computing gains popularity, more and more sensitive data and services are stored and provided online. Consequently, computer security has become more crucial than ever before. Cloud providers are especially interested in keeping cloud resources safe to help protect their clients' assets and to avoid legal liability.

"Honeypots" are one mechanism that can be used to study and detect attackers as well as attack patterns. Honeypots are computing systems or resources that are not meant to be used by ordinary non-malicious users. Instead, they are designed to attract cyber attackers to launch cyberattacks. Honeypots, however, require additional computing resources to build and maintain. For example, a honeypot builder might be required to acquire and use additional cloud resources to host honeypots. These honeypots would need to use additional network bandwidth for their activities so that they appear to attackers to be ordinary computing resources. Honeypots might also pose security risks on third-party resources that are co-located on the same computing device as the honeypots.

It is with respect to these and other considerations that the disclosure made herein is presented.

SUMMARY

The techniques disclosed herein enable systems to detect network attacks and vulnerable network resources utilizing existing network resources. For example, ordinary network resources (i.e. non-honeypots) that are vulnerable to attack can be utilized as virtual honeypots. Activity patterns that are unique to the ordinary resources, but not other well-protected resources, can be used to identify attack patterns against network resources. The techniques disclosed herein can improve the security of network resources by detecting vulnerable network resources, recognizing attack patterns and taking actions to reduce the risk of further attacks. In addition, by utilizing virtual honeypots, rather than real honeypots, computing resources, such as CPU time, memory usage and network bandwidth can also be saved because there is no need to operate additional network resources apart from the real network resources.

More specifically, implementations of the techniques described herein can build and train a vulnerability model for predicting the vulnerability of network resources. The training of the vulnerability model can be performed using a set of training examples. The training examples can be collected by using initial vulnerability scores and activity data for the network resources. The initial vulnerability scores can be calculated based on configuration data associated with the network resources, such as the security configuration of the network resources. The activity data of the network resources can include activity data. such as the network traffic coming into or going out of the network resources or data identifying activities that occurred on the network resources. The activity data can be used as input and the initial vulnerability scores can be used as labels for training the vulnerability model.

Once the vulnerability model has been trained, new activity data can be monitored and collected from the network resources. The new activity data can then be used as input to the vulnerability model to generate updated vulnerability scores for the network resources. Because the updated vulnerability scores are calculated based upon the new activity data, the updated vulnerability scores can be considered predicted vulnerability scores indicating the vulnerability of the corresponding network resources in their current network environment.

Based on the predicted vulnerability scores, vulnerable network resources can be identified, and activities associated with the vulnerable network resources can be compared with activities of other secure network resources to identify activity patterns that are unique to the vulnerable network resources. These unique activity patterns represent the attack patterns of the attackers and can be analyzed to provide insights in understanding the nature of the attack itself and the attackers who launched the attack. In addition, one or more actions can be taken to increase the security of the vulnerable network resources. For example, the vulnerable network resources can be taken offline, or shut down. Alternatively, or additionally, a warning message can be sent to the administrators or owners of the network resources to inform them about the vulnerability of the network resources as well as the attack patterns. The vulnerability of the network resources and the attack patterns can facilitate the administrators of the network resources to take proper actions, such as re-configure the network resources, to strengthen the security of the network resources.

This Summary is provided to introduce a selection of concepts in a simplified form that are further described below in the Detailed Description. This Summary is not intended to identify key or essential features of the claimed subject matter, nor is it intended to be used as an aid in determining the scope of the claimed subject matter. The term "techniques," for instance, may refer to system(s), method(s), computer-readable instructions, module(s), algorithms, hardware logic, and/or operation(s) as permitted by the context described above and throughout the document.

BRIEF DESCRIPTION OF THE DRAWINGS

The Detailed Description is described with reference to the accompanying figures. In the figures, the left-most digit(s) of a reference number identifies the figure in which the reference number first appears. The same reference numbers in different figures indicate similar or identical items. References made to individual items of a plurality of items can use a reference number with a letter of a sequence of letters to refer to each individual item. Generic references to the items may use the specific reference number without the sequence of letters.

DETAILED DESCRIPTION

Figure 1:
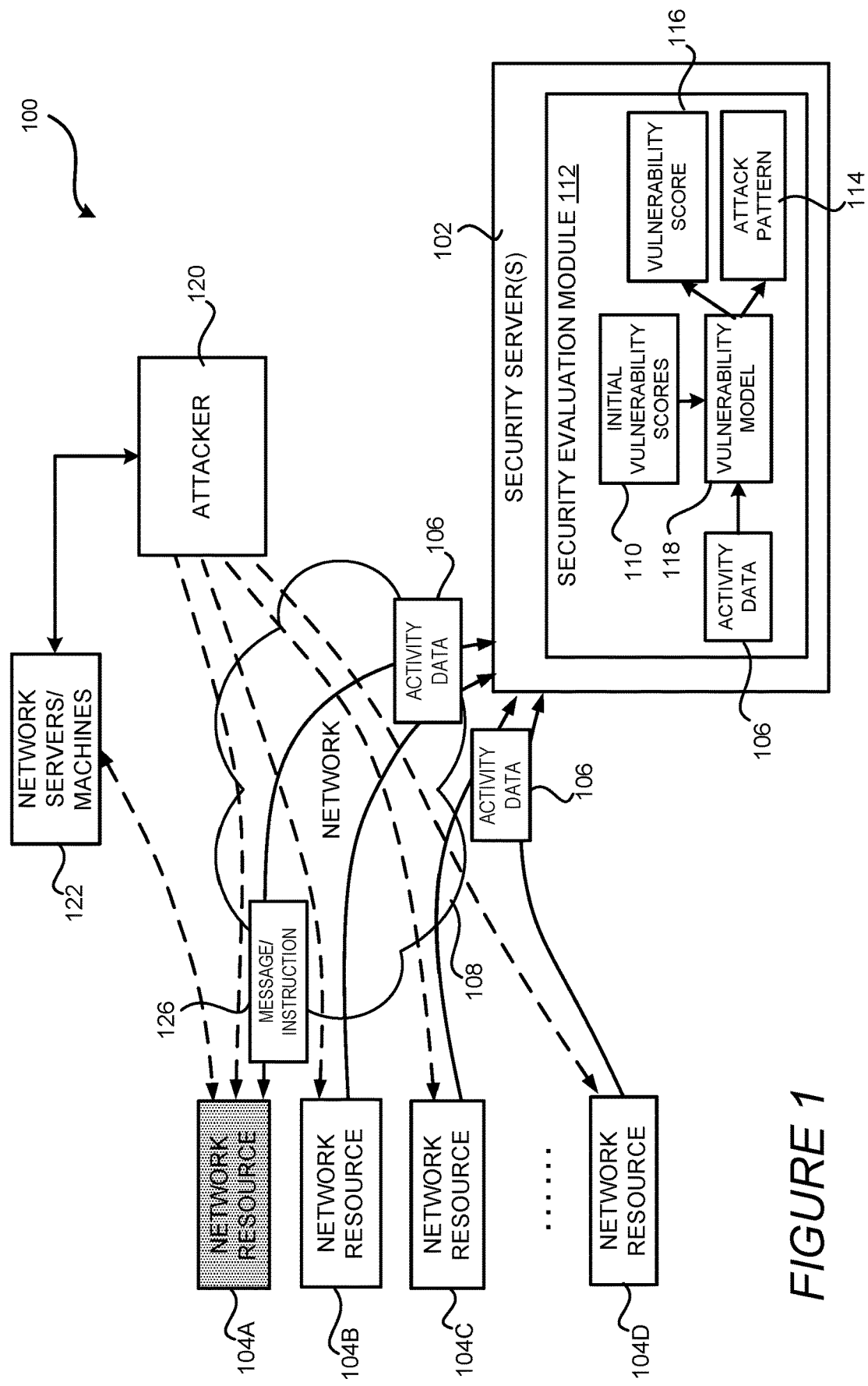
FIG. 1 is a block diagram of a system for identifying vulnerable network resources and detecting attack patterns.

The following Detailed Description discloses techniques and technologies for identifying vulnerable network resources and detecting attack patterns on network resources by utilizing virtual honeypots. The virtual honeypots can include pre-existing network resources that are poorly configured in terms of their security so that these network resources are vulnerable to cyberattacks. The virtual honeypots are real network resources and thus do not consume extra resources associated with a real honeypot, such as CPU time, memory spaces, network bandwidth, etc. However, the pre-existing vulnerability of the virtual honeypots can attract attackers just like real honeypots. Analyzing the activities associated with virtual honeypots can reveal information about the cyberattacks and the attackers and be utilized to strengthen the security of network resources.

More specifically, one or more security servers can collect data about network resources and generate an initial vulnerability score for each of the network resources. The security servers can further observe activity data associated with the network resources, such as the network traffic data, process creation data, and/or query data of the network resources. The initial vulnerability scores and the activity data can be utilized to build and train a vulnerability model for predicting the vulnerability of the network resources.

After the vulnerability model has been trained, the vulnerability model can accept new activity data associated with the network resources as input, and output vulnerability scores for the network resources as a prediction of their respective vulnerabilities in the current network environment. One or more vulnerable network resources can then be identified based on the predicted vulnerability scores.

Activities associated with vulnerable network resources can then be compared to activities associated with other secure network resources to identify attack patterns that are unique to the vulnerable network resources. Because the attack patterns have been found to be associated with the vulnerable network resources, it can be determined that the vulnerable network resources have been compromised, that actions need to be taken in order to prevent further attacks, and the type of actions that need to be taken to improve the security of the vulnerable network resources. For example, these network resources can be taken offline or shut down. In addition, warning messages can be sent to the administrators or owners of the network resources to inform them about the compromise, the vulnerability of the network resources as well as the attack pattern. The vulnerable network resources and other network resources can also be re-configured to improve their security.

The techniques disclosed herein can improve the security of the network resources by detecting vulnerable network resources, recognizing attack patterns and initiating actions to reduce the risk of further attacks. In addition, the techniques disclosed herein eliminate the need of building real honeypots thereby eliminating the consumption of resources, such as CPU time, memory space and network bandwidth, associated with building and maintaining real honeypots.

It should be appreciated that the above-described subject matter may be implemented as a computer-controlled apparatus, a computer process, a computing system, or as an article of manufacture such as a computer-readable storage medium. While the subject matter described herein is presented in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other computer system configurations, including hand-held devices, multiprocessor systems, microprocessor-based or programmable consumer electronics, minicomputers, mainframe computers, and the like.

In the following detailed description, references are made to the accompanying drawings that form a part hereof, and in which are shown by way of illustration specific configurations or examples. Referring now to the drawings, in which like numerals represent like elements throughout the several figures, aspects of a computing system, computer-readable storage medium, and computer-implemented methodologies for determining qualified contributors of a document are presented.

Referring now to FIG. 1, a system 100 is provided to illustrate aspects of the present disclosure. In this example, a system 100 can include one or more security servers 102. The security servers 102 may represent one or more conventional server computers, Web servers, database servers, or network appliances. Alternatively, the security servers 102 may represent a user computing device, such as a personal computer ("PC"), a desktop workstation, a laptop, a notebook, a mobile device and the like.

The security servers 102 can be configured to include a security evaluation module 112 for evaluating the security or vulnerability of one or more network resources 104A-104D (which may be referred to herein individually as a network resource 104 or collectively as the network resources 104). The network resources 104 can include various server computers, such as conventional server computers, Web servers, database servers, or network appliances. In addition, the network resources 104 may also include user computing devices, such as a PC, a desktop workstation, a laptop, a notebook, a mobile computing device and the like. The network resources 104 may also include virtual machines executing on one or more physical servers. The network resources 104 can communicate with the security servers 102 over a network 108, which might be a local-area network ("LAN"), a wide-area network ("WAN"), the Internet, or any type of data communications network known in the art that enables communications with the security servers 102.

In one scenario, the security servers 102 can be hosted by a cloud service provider configured to provide network resources 104, such as virtual machines, to various users. The users can utilize the network resources 104 to meet their respective needs, such as providing an online service to customers or employees. For example, a company might choose to acquire a network resource 104 from the cloud service provider to host a company server so that employees of the company can log into the server remotely for work-related purposes. However, the network resource 104 might not be properly configured, thereby making it vulnerable to cyberattacks. For example, an administrator of the network resources 104 for the company might have failed to configure a firewall for the network resource 104 and permitted access to the network resources 104 using default usernames and passwords. As a result, this network resource 104 is more likely to be compromised by cyberattacks than other properly configured network resources 104.

For instance, an attacker 120 might try to gain access to the network resources 104 by "cracking" a user's password. The attacker 120 can run programs on its own device to use many methods to access accounts. For example, the attacker 120 can use brute force attacks to guess the password or compare various word combinations against a dictionary file to obtain the password. In such an attack, the network resources 104 having a weak password configuration, such as network resource 104A shown in FIG. 1 in a shaded block, will likely be compromised by the attack and the attacker 120 can gain access to the network resource 104A. After gaining access to the network resource 104A, the attacker 120 can perform various actions on the network resource 104A, including the possibility of gaining access to other network resources 104.

As an example, the attacker 120 can install malware or other types of malicious software on the network resource 104A to instruct the network resource 104A to communicate with and execute commands from a network server 122 under the control of the attacker 120, such as a command and control server. This compromised network resource 104A can cause further damage to the network resources 104 on the network, such as collecting sensitive information or distributing spam. It should be noted that the above example is merely illustrative and should not be construed as limiting. Various other types of attacks can be launched by the attacker 120 and can be detect by the technologies presented herein.

To identify the vulnerable network resource 104A, the security servers 102 can be employed to implement a security evaluation module 112 that evaluates the vulnerability of the network resources 104. The security servers 102 can monitor the network resources 104 by receiving activity data 106 from each of the network resources 104. The activity data 106 can include dynamic information about the network resources 104, such as inbound and outbound network traffic of the network resources 104. The network traffic of a network resource 104 can indicate suspicious behavior by the network resources 104, thereby indicating that the network resources 104 might have been compromised. For example, the outbound network traffic of the network resource 104A might show that the network resource 104A constantly communicates with a control and command server or an unknown IP address. In another example, the network traffic of the network resource 104A might show that it has sent a large number of domain name server ("DNS") requests to a DNS server within a short period of time.

In addition to network traffic, process creation data describing the activity of creating new processes on the network resources 104 can also be helpful in identifying vulnerable and compromised network resources 104 and be included in the activity data 106. For example, malware installed on the compromised network resource 104A might have caused the network resource 104A to create many processes in order to carry out various malicious tasks. Such a high volume of process creation activities can be utilized to identify the vulnerability of the network resources 104. Similarly, other activities occurring on the network resources 104, such as performing queries, are also indicative of a network resource 104 that has been compromised and can be included in the activity data 106. It should be understood that the activities of the network resources described above are provided by way of illustration only and should not be construed as limiting. Data describing any type of activity associated with the operation of network resources can be utilized herein for predicting the vulnerability of the network resources.

The obtained activity data 106 can be utilized by the security evaluation module 112 to train a vulnerability model 118. The vulnerability model 118 can be any machine learning model suitable for predicting outcomes based on a set of input features. For example, the vulnerability model 118 can be an artificial neural network ("ANN") model trained to predict the vulnerability of network resources 104 by considering examples of vulnerability of the network resources 104 and without being programmed with any task-specific rules.

The vulnerability model 118 can be trained before it is used to predict the vulnerability of the network resources 104. The training can be performed by generating a set of initial vulnerability scores 110 for the network resources 104 as the examples of the vulnerability of the network resources 104 and for labeling activity data 106 collected from the network resources 104. The initial vulnerability scores 110 can be determined based on configuration data of the network resources 104, such as the security configuration of the network resources 104 including the setup of a firewall, the strength of user passwords, the number of users, etc.

Once the vulnerability model 118 is trained, the security evaluation module 112 can obtain new activity data 106 from the network resources 104 and use the new activity data 106 as an input to the vulnerability model 118 to predict the vulnerability of the network resources 104. Additional details regarding the training and operation of the vulnerability model 118 will be provided below with regard to FIG. 2.

In some implementations, the predicted vulnerability of a network resource 104 is quantified as a vulnerability score 116 for the network resource 104. In some configurations, the higher the vulnerability score 116 of a network resource 104 is, the more vulnerable the network resource 104 is and the higher likelihood that the network resource 104 has been compromised. Likewise, the lower the vulnerability score 116 of a network resource 104 is, the less vulnerable the network resource 104 is and the lower likelihood that the network resource 104 has been compromised.

The security evaluation module 112 can choose a mechanism to identify the vulnerable network resources 104 based on the vulnerability scores 116. For example, the security evaluation module 112 can determine that the network resources 104 whose vulnerability scores 116 are higher than a threshold value can be considered as vulnerable and have been compromised. It should be noted that the technologies presented herein analyze activities of the network resources 104 to identify vulnerable network resources 104. A network resource 104 typically perform suspicious activities after being compromised. As such, it is highly likely that the identified vulnerable network resources 104 have already been compromised. Accordingly, network resources 104 that have been identified as vulnerable and those network resources 104 that have actually been compromised are used interchangeably in this application.

In addition to the vulnerable network resources 104, the output of the vulnerability model 118 can also be useful in analyzing the attacks and the attacker 120. As discussed above, vulnerable network resources 104, i.e. the virtual honeypots, act similarly to real honeypots and, as a result, are likely to attract attackers 120. As such, analyzing the activities associated with the virtual honeypots can reveal the nature of the attacks. Specifically, the activity data 106 for the identified compromised network resources 104, i.e. the virtual honeypots, can be summarized and compared with the activity data 106 of the uncompromised network resources 104. Those activity patterns that are unique to the compromised network resources 104 can indicate an attack pattern and can be analyzed to provide helpful insights in understanding the attack itself, the attacker 120 who launched the attack, and changes that can be made to the network resource 104 to prevent a similar attack in the future.

Once the compromised network resources 104 have been identified, one or more actions can be taken to avoid further attacks on the compromised network resources 104 and to increase the security of the compromised network resources 104. For example, the security servers 102 can send an instruction 126 to the compromised network resource 104A to have the compromised network resources 104 be turned off or taken offline to eliminate further network traffic. Alternatively, or additionally, a warning message 126 can be sent to the administrators or owners of the network resources 104 to inform them about the vulnerability of the network resources 104 as well as the attack pattern 114 and recommend remedial actions to be taken to avoid further attacks, such as reconfiguring the compromised network resources and other network resources in a proper way to strengthen their security. Additional details regarding the identification of vulnerable network resources 104 will be provided below with regard to FIGS. 2-4.

It should be noted that in some scenarios, such as a cloud service provider hosting the security servers 102, the cloud service provider can reserve the right to access the configuration data and activity data of the network resources 104 for security monitoring and improvement purposes. In other scenarios where the entity hosting the security servers 102 does not have the right to access the data of the network resources 104, the owners or administrators of the network resources 104 can grant permission for the security servers 102 to obtain such activity data 106. For example, the administrator or owner of the network resources 104 can subscribe to security evaluation services provided by the security servers 102 and grant permission to access the configuration data or activity data along with the subscription. It should be appreciated that although the above disclosures describe a cloud service provider hosting the security servers 102, the security servers 102 can be hosted and managed by any entity that would like to monitor and improve the security of network resources.

Figure 2:
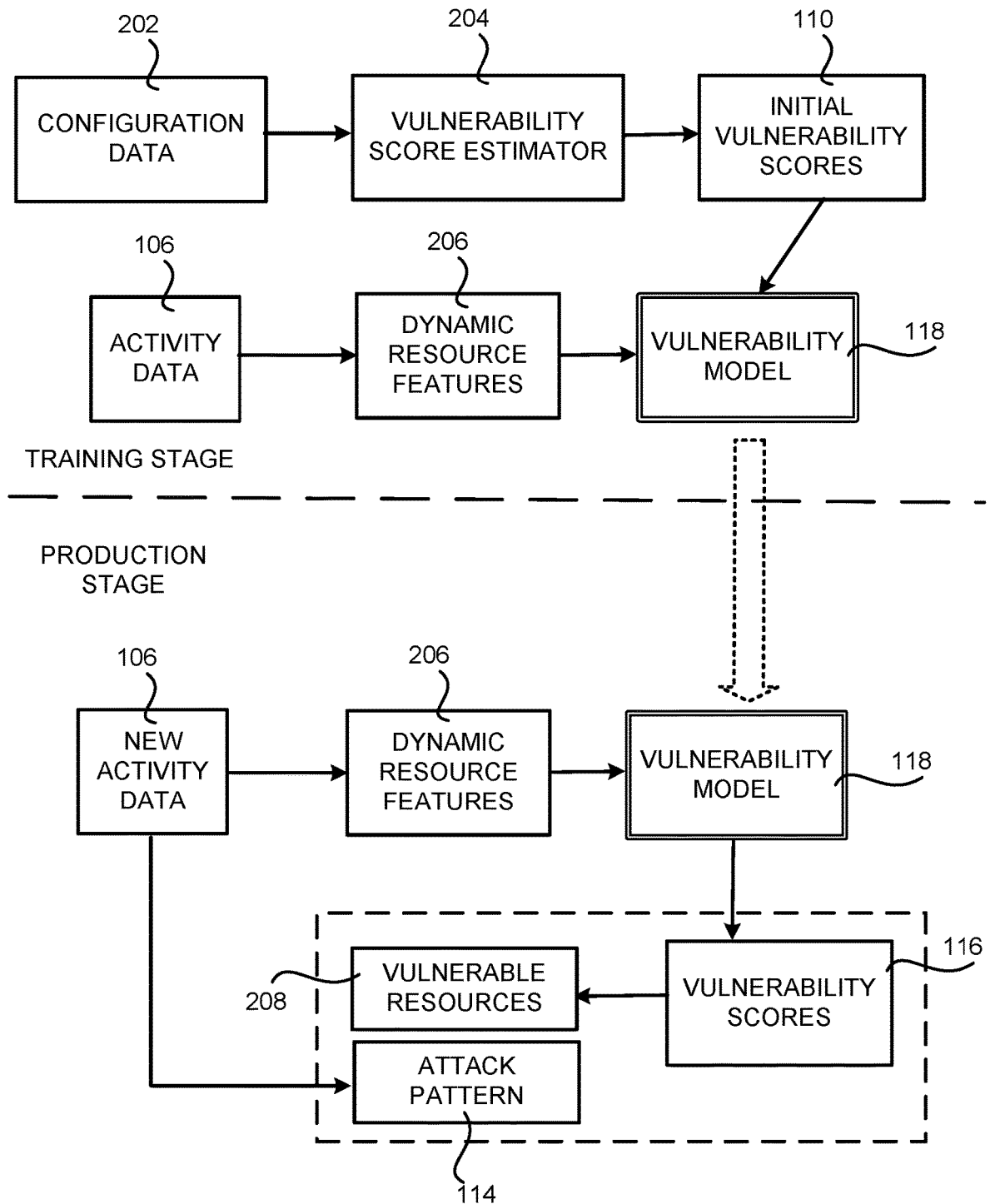
FIG. 2 is a block diagram illustrating a training stage and a production stage of a vulnerability model for predicting vulnerability scores of network resources.

Referring now to FIG. 2, where the training and testing of the vulnerability model 118 is illustrated. As discussed briefly above, the vulnerability model 118 is configured to map activity data 106 of a network resource 104 to a vulnerability score 116. In other words, the vulnerability model 118 can classify each of the network resources 104, based on its activity data 106, into a class represented by the predicted vulnerability score 116. As a result, when new activity data 106 is collected for a network resource 104, the vulnerability model 118 can predict the vulnerability score 116 of the network resource 104 based on the new activity data 106.

There are two stages associated with the vulnerability model 118: a training stage and a production stage, also called a testing stage. During the training stage, the vulnerability model 118 can learn to predict the vulnerability of network resources 104 by considering examples of vulnerability of the network resources 104. In one implementation, supervised training is performed on the vulnerability model 118. During supervised training, the vulnerability model 118 is provided with a set of training examples, each training example including an input-output pair: input activity data 106 of a network resource 104 and a predicted vulnerability score of the network resource 104. The training algorithm can analyze the training data and produce an inferred function for mapping the inputs to the outputs. The inferred function can be reflected in the weights used by the vulnerability model 118.

In order to generate the training examples, the security evaluation module 112 can calculate an initial vulnerability score 110 for each of the network resources 104 as the output vulnerability score in the training examples. The initial vulnerability scores 110 can be calculated by employing a vulnerability score estimator 204 implementing any vulnerability score estimation method known in the art. For example, the vulnerability score estimator 204 can calculate the initial vulnerability scores 110 based on configuration data 202 associated with the network resources 104, such as the security configuration of the network resources 104 including data indicating whether a firewall has been configured for a network resource, the strength of user passwords, the number of users, etc.

The input activity data 106 in the training examples can be obtained by collecting the current activity data 106 from the network resources 104. In some implementations, the activity data 106 for each network resource 104 can be converted into a set of dynamic resource features 206 before being applied onto the vulnerability model 118 for training. The dynamic resource features 206 can include the aspects of the activity data 106 that the designer of the vulnerability model 118 deems important in predicting the vulnerability of the network resources 104. In other implementations, the dynamic resource features 206 can include all aspects of the activity data 106, and the vulnerability model 118 can determine the important aspects of the activity data 106 during training. In addition, the dynamic resource features 206 can be generated in a format that is suitable for the vulnerability model 118, such as a vector or a matrix of values representing the relevant activities.

After the training stage is complete, the vulnerability model 118 can be used in the production stage to perform the task of predicting vulnerability scores of the network resources 104. During the production stage, new activity data 106 can be collected from the network resources 104, which can be converted to dynamic resource features 206 in the same way as in the training stage. The vulnerability model 118 can take the new dynamic resource features 206 as input and output the predicted vulnerability score 116 for each of the network resources 104.

Vulnerable network resources 104 can then be identified based on the vulnerability scores 116. For example, the security evaluation module 112 can determine that the network resources 104 whose vulnerability score 116 is higher than a threshold value can be considered a vulnerable network resource 208. In addition, the activity data 106 associated with the vulnerable network resources 208 can be analyzed and compared with the activity data 106 of well-protected network resources 104 to identify activity patterns that are unique to the vulnerable network resources 208. These unique activity patterns can identify the attack pattern 114 of the attacker and can be analyzed to provide helpful insights in understanding the attack itself and the attackers who launched the attack. The unique activity patterns can also be helpful in reconfiguring the network resources to strengthen their security.

It should be understood that while in the above description, the initial vulnerability scores 110 are determined based on configuration data 206 associated with the network resources 104, the initial vulnerability scores 110 can be determined in other ways, such as by using both the configuration data 206 and the activity data 106 or using the activity data 106 alone. It should be further appreciated that while above description focuses on supervised training, unsupervised training of the vulnerability model 118 can also be utilized. In addition, the training stage and production stage of the vulnerability model 118 are described merely for illustration purposes and should not be construed as limiting. The mechanisms of building and utilization of a vulnerability model 118 that do not involve separate training and production stages can also be employed herein to predict the vulnerability of the network resources 104.

Figure 3:
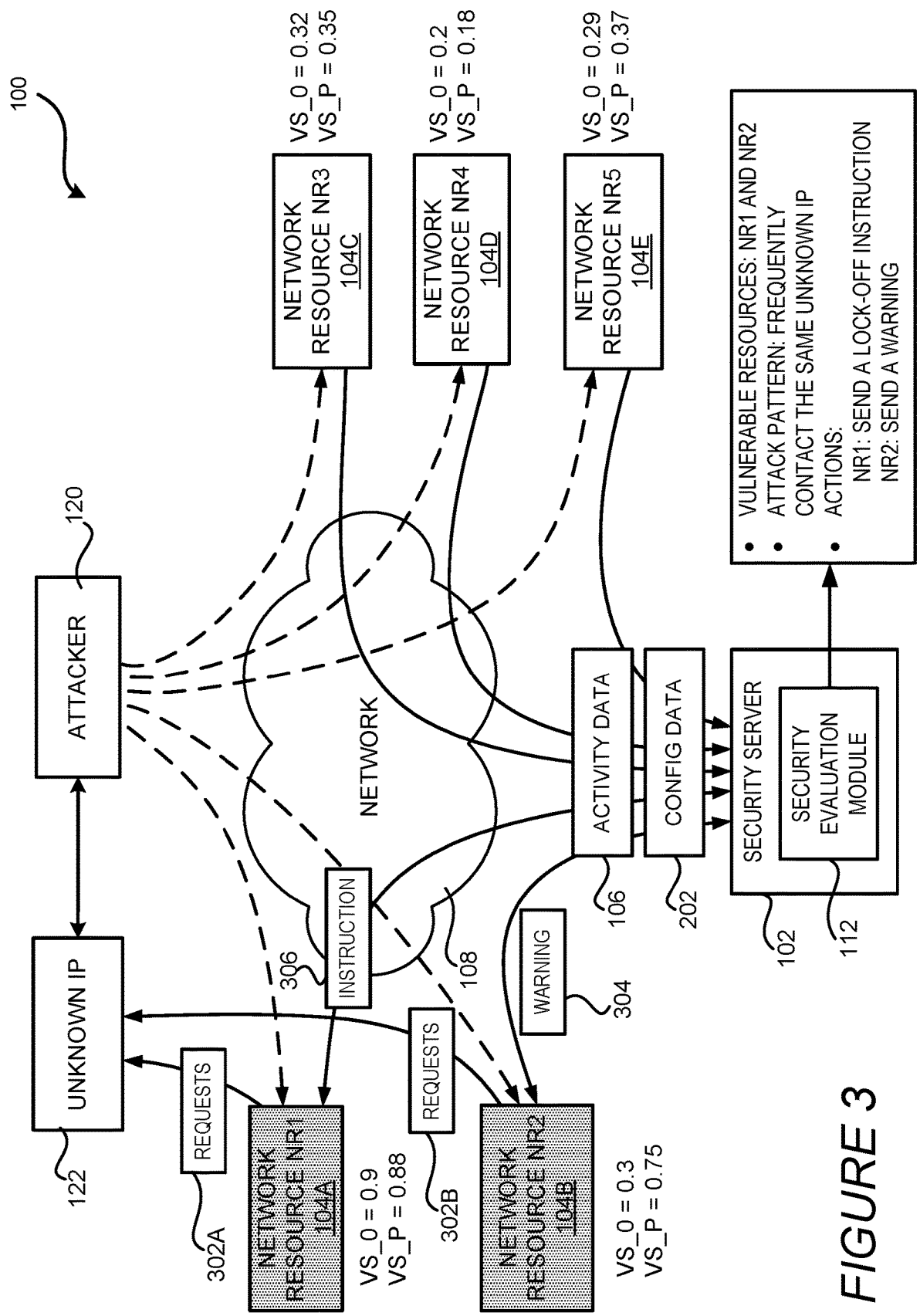
FIG. 3 illustrates an example for identifying vulnerable network resources and detecting attack patterns utilizing a vulnerability model.

Referring now to the example shown in FIG. 3, where a security server 102 monitors the vulnerability of five network resources 104A-104E, namely, NR1, NR2, NR3, NR4 and NR5. In this example, an attacker 120 might have tried to attack the five network resources to gain access to the network resources 104. In order to improve the security of these resources, the security server 102 can first collect activity data 106 from the five network resources 104 as the input data for training the vulnerability model 118. In addition, the security server 102 can also collect configuration data 202 from each of five network resources 104 to generate the initial vulnerability scores 110 as the output data in the training examples.

In the example shown in FIG. 3, the values of the initial vulnerability scores 110, VS_0, fall between 0 and 1, with 0 representing no risk of the network resource being vulnerable and 1 representing highest risk of being vulnerable. In FIG. 3, The initial vulnerability score 110 for NR1 is 0.9 indicating a high likelihood of NR1 being vulnerable. The initial vulnerability score 110 for NR2 is 0.3 indicating a low likelihood of NR2 being vulnerable. The initial vulnerability scores 110 for NR3, NR4 and NR5 are 0.32, 0.2 and 0.29, respectively, each indicating a low likelihood of the respective network resource 104 being vulnerable.

After the training of the vulnerability model 118 is complete, new activity data 106 can be collected from the five network resources 104, and the vulnerability model 118 can be utilized to predict the vulnerability of the five network resources 104 based on the new activity data 106. FIG. 3 illustrates the predicted vulnerability scores, VS_P, for each of the five network resources 104. As can be seen from FIG. 3, the predicted vulnerability score 116 of NR1 is high, which is consistent with its initial vulnerability score 110. Similarly, the predicted vulnerability scores 116 for NR3, NR4, and NR5 are relatively low, which is also consistent with their respective initial vulnerability scores 110. The predicted vulnerability score 116 for NR2, however, is much higher than its initial vulnerability score 110.

One of the reasons for the discrepancies between the initial vulnerability score 110 and the predicted vulnerability scores 116 is that they are determined based on different aspects of the network resources 104. In the above example, the initial vulnerability scores 110 are determined based on the configuration data 202 of the network resources 104, such as the security configuration, whereas the vulnerability scores 116 are determined based on the activity data of the network resources 104, such as network traffic and/or process creation data of the network resources 104. In practice, a network resource 104 that is properly configured in terms of security might nonetheless be successfully attacked and compromised by the attacker 120. As such, a properly configured network resource 104 can have a low initial vulnerability score 110, but a high predicted vulnerability score 116. This illustrates one advantage of the technologies presented herein over the existing methods for estimating the vulnerability scores 116, that is, the technologies presented herein for predicting the vulnerability can evolve as conditions change and can successfully identify compromised network resources 104 regardless of their initial vulnerability scores.

Based on the predicted vulnerability scores 116, the security evaluation module 112 can determine that NR1 and NR2 are compromised vulnerable network resources 208 and can then analyze the activity data 106 associated with NR1 and NR2 to identify unique activity patterns for NR1 and NR2. The analysis can show that both NR1 and NR2 have been communicating with an unknown IP address 122 at a high frequency, such as sending a large number of requests 302 to the unknown IP address 122 over a short time period. Other network resources, NR3-NR5, are not performing activities. The security evaluation module 112 can then determine that the attack pattern 114 for the current attacker includes frequent communications the same unknown IP address. The security evaluation module 112 can further label the unknown IP address as a suspicious or malicious IP address.

The security evaluation module 112 can further identify measures to be implemented in order to reduce the likelihood that future attacks on the compromised network resources NR1 and NR2 will be successful. For example, the security evaluation module 112 might determine that based on the permission given by the administrator or owner of NR1, an instruction 306 can be sent to NR1 to shut down and/or lock NR1 so that no further communication to and from NR1 can be conducted. In addition, a message can be sent to the administrator or owner of NR1 to report the attack and the attack pattern so that further actions to increase the security of NR1 can be performed, such as setting up a firewall, increasing the strength of user passwords, etc. Regarding NR2, the security evaluation module 112 might determine that the owner of NR2 has not given the security evaluation module 112 permission to directly operate on NR2. In such a scenario, a warning message 304 can be sent to the owner of NR2 to warn him or her about the attack and the identified attack pattern so that the owner can determine on his own the type of actions to take to reduce the vulnerability of NR2.

It should be understood that the example shown in FIG. 3 is merely illustrative and should not be construed as limiting. Various types of attacks might occur and be detected by the security evaluation module 112, and various actions can be taken by the security evaluation module 112 to reduce the likelihood of success of future attacks.

Figure 4:
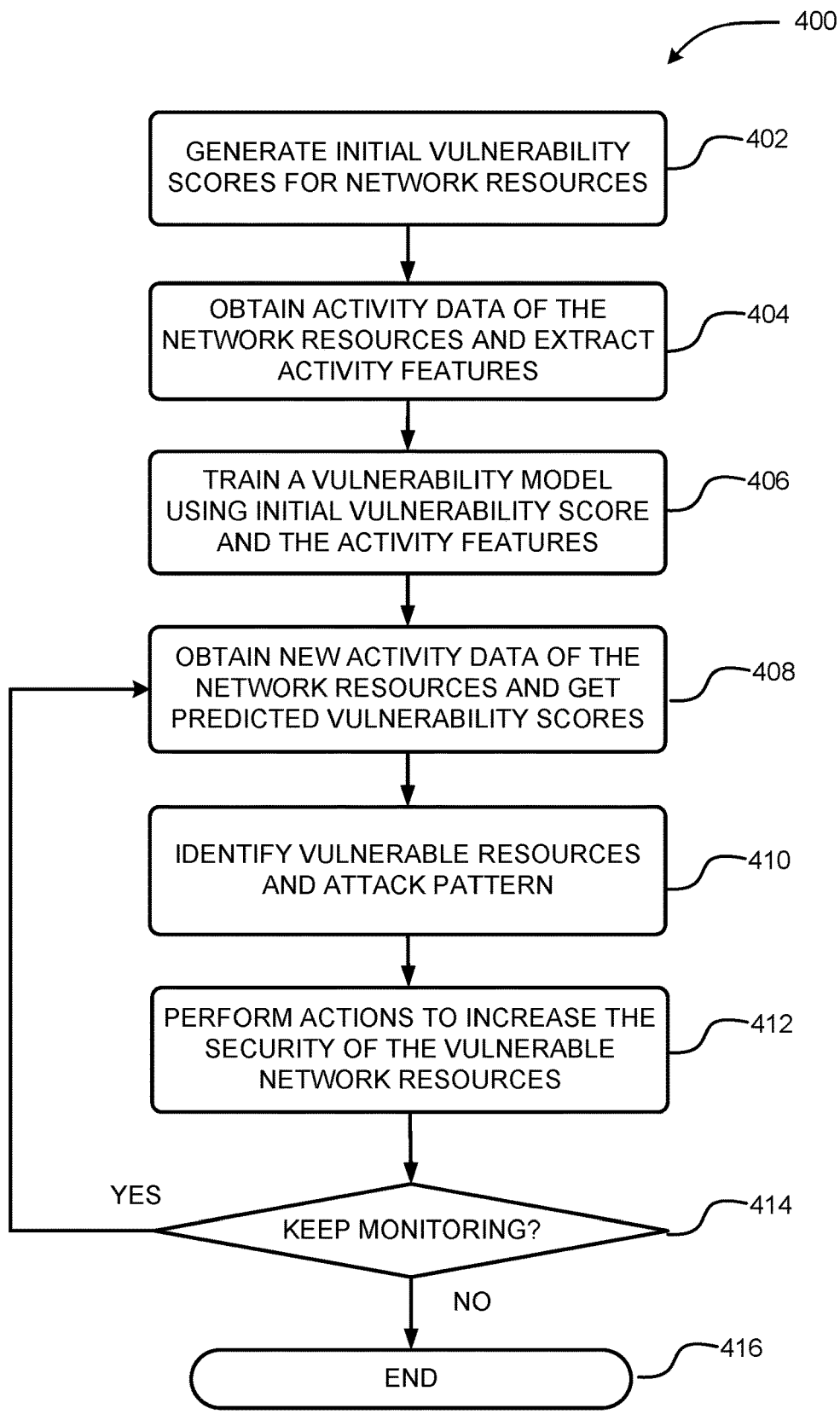
FIG. 4 is a flow diagram showing aspects of a routine for enabling the techniques disclosed herein.

Turning now to FIG. 4, aspects of a routine 400 for predicting vulnerability of network resources 104 are shown and described below. It should be understood that the operations of the methods disclosed herein are not presented in any particular order and that performance of some or all of the operations in an alternative order(s) is possible and is contemplated. The operations have been presented in the demonstrated order for ease of description and illustration. Operations may be added, omitted, and/or performed simultaneously, without departing from the scope of the appended claims.

It also should be understood that the illustrated methods can end at any time and need not be performed in their entireties. Some or all operations of the methods, and/or substantially equivalent operations, can be performed by execution of computer-readable instructions included on a computer-storage media, as defined below. The term "computer-readable instructions," and variants thereof, as used in the description and claims, is used expansively herein to include routines, applications, application modules, program modules, programs, components, data structures, algorithms, and the like. Computer-readable instructions can be implemented on various system configurations, including single-processor or multiprocessor systems, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These operations, structural devices, acts, and modules may be implemented in software, in firmware, in special purpose digital logic, and any combination thereof.

For example, the operations of the routine 400 are described herein as being implemented, at least in part, by modules running the features disclosed herein can be a dynamically linked library ("DLL"), a statically linked library, functionality produced by an application programming interface ("API"), a compiled program, an interpreted program, a script or any other executable set of instructions. Data can be stored in a data structure in one or more memory components. Data can be retrieved from the data structure by addressing links or references to the data structure.

Although the following illustration refers to the components of the figures, it can be appreciated that the operations of the routine 400 may be also implemented in many other ways. For example, the routine 400 may be implemented, at least in part, by a processor of another remote computer or a local circuit. In addition, one or more of the operations of the routine 400 may alternatively or additionally be implemented, at least in part, by a chipset working alone or in conjunction with other software modules. In the example described below, one or more modules of a computing system can receive and/or process the data disclosed herein. Any service, circuit or application suitable for providing the techniques disclosed herein can be used in operations described herein.

With reference to FIG. 4, the routine 400 begins at operation 402 where the security evaluation module 112 generates initial vulnerability scores 110 for the network resources 104. In one implementation, the initial vulnerability scores 110 can be calculated based on the configuration data 202 of the network resources 104, such as the configuration or settings of the network resources 104. Additionally, or alternatively, the initial vulnerability scores 110 can also be determined based on activity data of the network resources 104, such as the activity data 106.

From operation 402, the routine 400 proceeds to operation 404 where the security evaluation module 112 can obtain activity data 106 of the network resources 104. As described above, the activity data 106 can include dynamic information about the network resources 104, such as inbound and outbound network traffic of the network resources 104, process creation data describing the activity of creating new processes on the network resources 104, query data and/or other activities occurred on the network resources 104.

In some implementations, the activity data 106 for each network resource 104 is converted into a set of dynamic resource features 206. For example, the dynamic resource features 206 can specify the aspects of the activity data 106 that the designer of the vulnerability model 118 deems important in predicting the vulnerability of the network resources 104. Alternatively, the dynamic resource features 206 can include all aspects of the activity data 106, and the vulnerability model 118 can determine the important aspects of the activity data 106 during training. In addition, the dynamic resource features 206 can be generated in a format that is suitable for the vulnerability model 118, such as a vector or a matrix of values representing the relevant activities.

The routine 400 then proceeds to operation 406 where a vulnerability model 118 can be trained through a supervised training mechanism. In supervised training, the vulnerability model 118 is provided with a set of training examples, each training example including an input-output pair: input activity data 106 or the dynamic resource features 206 of a network resource 104 and initial vulnerability scores 110 for the network resource 104. The training algorithm can analyze the training examples and produce an inferred function for mapping the input to the outputs. The inferred function can be reflected in the parameters and/or settings of the vulnerability model 118.

After the vulnerability model 118 has been trained, the routine 400 proceeds to operation 408 where the vulnerability model 118 can be used to predict the vulnerability of the network resources 104. Specifically, at operation 408, the security evaluation module 112 can obtain new activity data 106 from the network resources 104 and apply the new activity data 106 to the vulnerability model 118 to generate predicted vulnerability scores 116. In implementations where the activity data 106 is converted to dynamic resource features 206 during the training, the new activity data 106 can also be converted in the same way so that the format and dimension of the input to the vulnerability model 118 at the production stage are consistent with those at the training stage.

It should be noted that there might be discrepancies between the vulnerability scores 116 and the initial vulnerability scores 110. This is because the initial vulnerability scores 110 are calculated based on the configuration data of the network resources 104, whereas the vulnerability scores 116 are determined based on activity data of the network resources 104 considering the actual activities occurring on the network resources 104. In addition, the vulnerability scores 116 are determined based on the latest activity data 106 which captures the changed environment of the network resources 104. As such, the vulnerability scores 116 can better indicate the vulnerability of the network resources 104.

From operation 408, the routine 400 proceeds to operation 410 where the security evaluation module 112 can identify vulnerable resources 208 based on the vulnerability scores 116. For example, the security evaluation module 112 can determine that the network resources 104 whose vulnerability scores 116 are higher than a threshold value can be considered vulnerable network resources 208. In addition, the security evaluation module 112 can also identify attack patterns 114 at operation 410. For instance, the security evaluation module 112 can compare the activity data 106 of the identified vulnerable network resources 104 with the activity data 106 of the well-protected network resources 104. Those activity patterns that are unique to the identified vulnerable network resources 104 can show the attack pattern 114 of the attacker, can be analyzed to provide helpful insights in understanding the attack itself and the attackers who launched the attack and to help reconfigure the identified vulnerable network resources and other network resources to increase their security.

The routine 400 then proceeds to operation 412 where one or more actions can be performed to increase the security of the vulnerable network resources 208. As discussed above, the vulnerable network resources 208 are determined based on activities of the network resources 104 and a network resource 104 typically perform suspicious activities after being compromised. As such, it is likely that the identified vulnerable network resources 208 have already been compromised. Actions should be taken to avoid further attacks and to increase the security level of the vulnerable network resources 208. For example, the security servers 102 can send an instruction 126 to the compromised network resources 208 to have the compromised network resources 208 be turned off or taken offline to eliminate further network traffic. Alternatively, or additionally, a warning message 126 can be sent to the administrators or owners of the network resources 208 to inform them about the vulnerability of the network resources as well as the attack pattern 114 and recommend remedial actions to be taken to avoid further attacks.

From operation 412, the routine 400 proceeds to operation 414 where it is determined whether the security evaluation module 112 should continue monitoring the vulnerability of the network resources 104. If so, the routine 400 proceeds to operation 408 where the above described operations 408-412 can be performed again; if not, the routine 400 proceeds to operation 416, where it ends.

Figure 5:
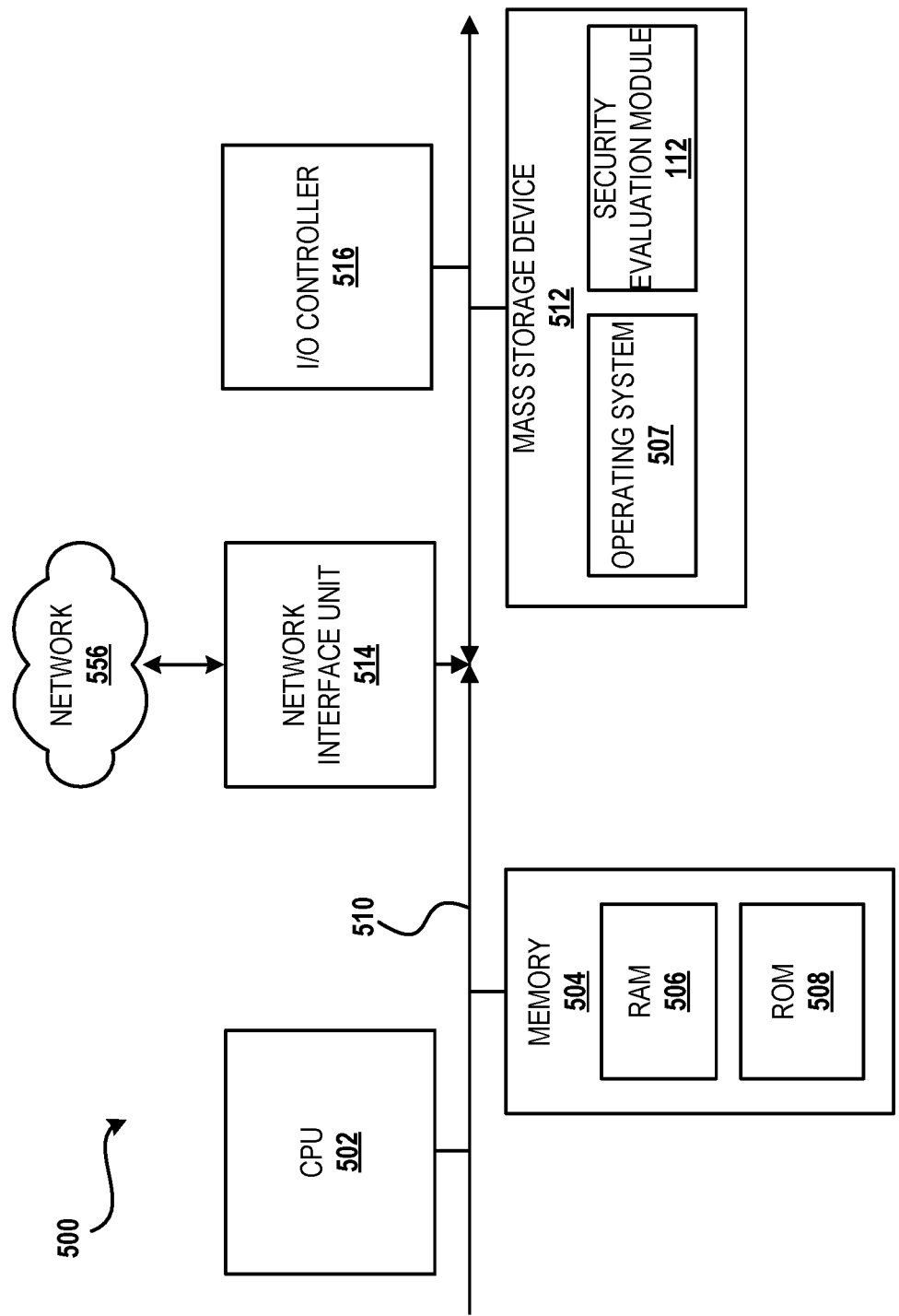
FIG. 5 is a computer architecture diagram illustrating an illustrative computer hardware and software architecture for a computing system capable of implementing aspects of the techniques and technologies presented herein.

FIG. 5 shows additional details of an example computer architecture 500 for a computer, such as the security servers 102 (FIG. 1), capable of executing the program components described herein. Thus, the computer architecture 500 illustrated in FIG. 5 illustrates an architecture for a server computer, a desktop computer, a netbook computer, a tablet computer, and/or a laptop computer. The computer architecture 500 may be utilized to execute any aspects of the software components presented herein.

The computer architecture 500 illustrated in FIG. 5 includes a central processing unit 502 ("CPU"), a system memory 504, including a random-access memory 506 ("RAM") and a read-only memory ("ROM") 508, and a system bus 510 that couples the memory 504 to the CPU 502. A basic input/output system containing the basic routines that help to transfer information between elements within the computer architecture 500, such as during startup, is stored in the ROM 508. The computer architecture 500 further includes a mass storage device 512 for storing an operating system 507, other data, and one or more applications, such as the security evaluation module 112.

The mass storage device 512 is connected to the CPU 502 through a mass storage controller (not shown) connected to the bus 510. The mass storage device 512 and its associated computer-readable media provide non-volatile storage for the computer architecture 500. Although the description of computer-readable media contained herein refers to a mass storage device, such as a solid state drive, a hard disk or CD-ROM drive, it should be appreciated by those skilled in the art that computer-readable media can be any available computer storage media or communication media that can be accessed by the computer architecture 500.

Communication media includes computer readable instructions, data structures, program modules, or other data in a modulated data signal such as a carrier wave or other transport mechanism and includes any delivery media. The term "modulated data signal" means a signal that has one or more of its characteristics changed or set in a manner so as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

By way of example, and not limitation, computer storage media may include volatile and non-volatile, removable and non-removable media implemented in any method or technology for storage of information such as computer-readable instructions, data structures, program modules or other data. For example, computer media includes, but is not limited to, RAM, ROM, EPROM, EEPROM, flash memory or other solid-state memory technology, CD-ROM, digital versatile disks ("DVD"), HD-DVD, BLU-RAY, or other optical storage, magnetic cassettes, magnetic tape, magnetic disk storage or other magnetic storage devices, or any other medium which can be used to store the desired information and which can be accessed by the computer architecture 500. For purposes of the claims, the phrase "computer storage medium," "computer-readable storage medium" and variations thereof, does not include waves, signals, and/or other transitory and/or intangible communication media, per se.

According to various configurations, the computer architecture 500 may operate in a networked environment using logical connections to remote computers through the network 556 and/or another network (not shown). The computer architecture 500 may connect to the network 556 through a network interface unit 514 connected to the bus 510. It should be appreciated that the network interface unit 514 also may be utilized to connect to other types of networks and remote computer systems. The computer architecture 500 also may include an input/output controller 516 for receiving and processing input from a number of other devices, including a keyboard, mouse, or electronic stylus (not shown in FIG. 5). Similarly, the input/output controller 516 may provide output to a display screen, a printer, or other type of output device (also not shown in FIG. 5).

It should be appreciated that the software components described herein may, when loaded into the CPU 502 and executed, transform the CPU 502 and the overall computer architecture 500 from a general-purpose computing system into a special-purpose computing system customized to facilitate the functionality presented herein. The CPU 502 may be constructed from any number of transistors or other discrete circuit elements, which may individually or collectively assume any number of states. More specifically, the CPU 502 may operate as a finite-state machine, in response to executable instructions contained within the software modules disclosed herein. These computer-executable instructions may transform the CPU 502 by specifying how the CPU 502 transitions between states, thereby transforming the transistors or other discrete hardware elements constituting the CPU 502.

Encoding the software modules presented herein also may transform the physical structure of the computer-readable media presented herein. The specific transformation of physical structure may depend on various factors, in different implementations of this description. Examples of such factors may include, but are not limited to, the technology used to implement the computer-readable media, whether the computer-readable media is characterized as primary or secondary storage, and the like. For example, if the computer-readable media is implemented as semiconductor-based memory, the software disclosed herein may be encoded on the computer-readable media by transforming the physical state of the semiconductor memory. For example, the software may transform the state of transistors, capacitors, or other discrete circuit elements constituting the semiconductor memory. The software also may transform the physical state of such components in order to store data thereupon.

As another example, the computer-readable media disclosed herein may be implemented using magnetic or optical technology. In such implementations, the software presented herein may transform the physical state of magnetic or optical media, when the software is encoded therein. These transformations may include altering the magnetic characteristics of particular locations within given magnetic media. These transformations also may include altering the physical features or characteristics of particular locations within given optical media, to change the optical characteristics of those locations. Other transformations of physical media are possible without departing from the scope and spirit of the present description, with the foregoing examples provided only to facilitate this discussion.

In light of the above, it should be appreciated that many types of physical transformations take place in the computer architecture 500 in order to store and execute the software components presented herein. It also should be appreciated that the computer architecture 500 may include other types of computing devices, including hand-held computers, embedded computer systems, personal digital assistants, and other types of computing devices known to those skilled in the art. It is also contemplated that the computer architecture 500 may not include all of the components shown in FIG. 5, may include other components that are not explicitly shown in FIG. 5, or may utilize an architecture completely different than that shown in FIG. 5.

Figure 6:
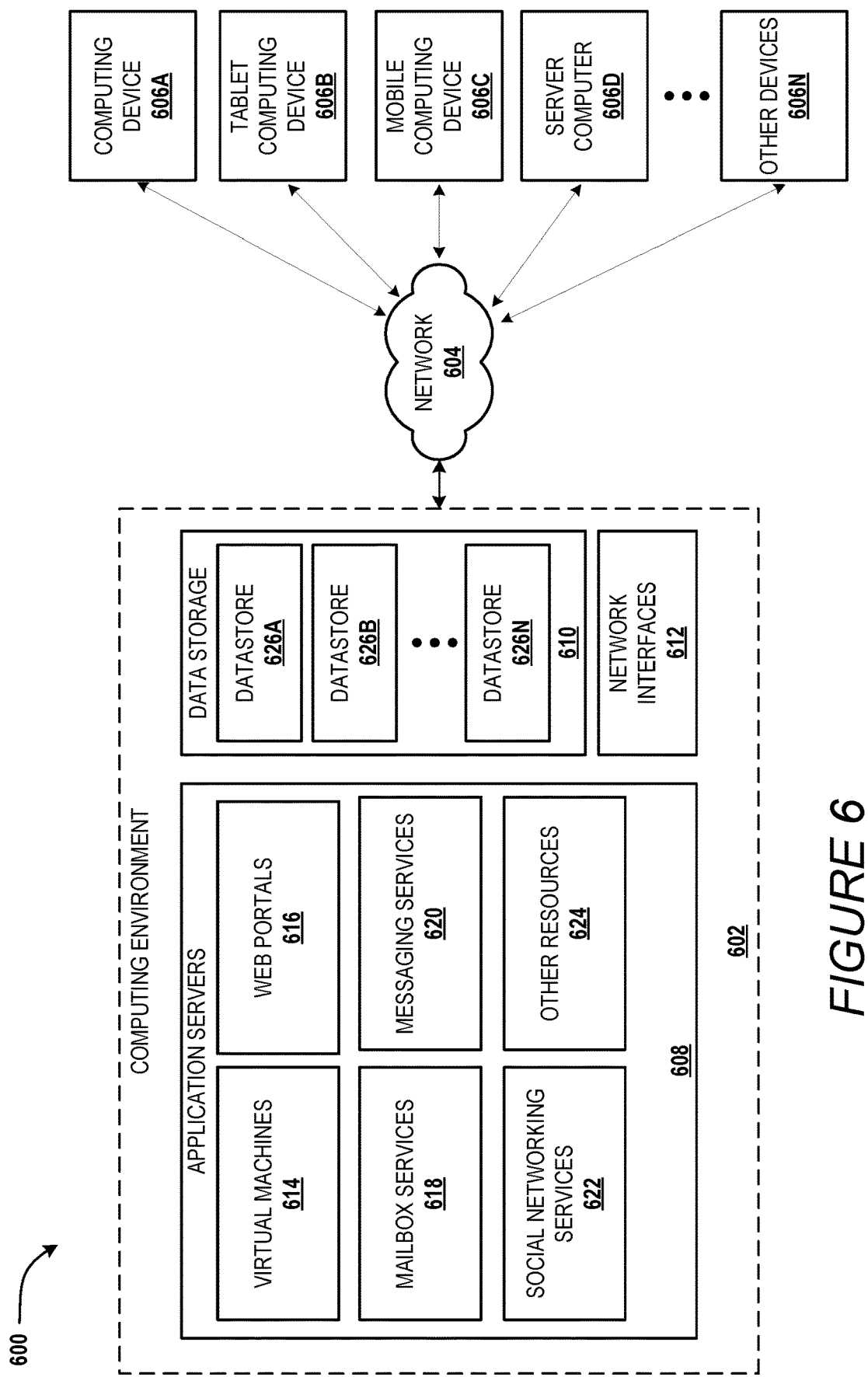
FIG. 6 is a diagram illustrating a distributed computing environment capable of implementing aspects of the techniques and technologies presented herein.

FIG. 6 depicts an illustrative distributed computing environment 600 capable of executing the software components described herein. Thus, the distributed computing environment 600 illustrated in FIG. 6 can be utilized to execute any aspects of the software components presented herein. For example, the distributed computing environment 600 can be utilized to execute aspects of the software components described herein.

According to various implementations, the distributed computing environment 600 includes a computing environment 602 operating on, in communication with, or as part of the network 604. The network 604 may be or may include the network 556, described above with reference to FIG. 5. The network 604 also can include various access networks. One or more client devices 606A-606N (hereinafter referred to collectively and/or generically as "clients 606" and also referred to herein as computing devices 606) can communicate with the computing environment 602 via the network 604 and/or other connections (not illustrated in FIG. 6). In one illustrated configuration, the clients 606 include a computing device 606A such as a laptop computer, a desktop computer, or other computing device; a slate or tablet computing device ("tablet computing device") 606B; a mobile computing device 606C such as a mobile telephone, a smart phone, or other mobile computing device; a server computer 606D; and/or other devices 606N. It should be understood that any number of clients 606 can communicate with the computing environment 602. An example computing architecture for the clients 606 are illustrated and described herein with reference to FIG. 5. It should be understood that the illustrated clients 606 and computing architectures illustrated and described herein are illustrative, and should not be construed as being limited in any way.

In the illustrated configuration, the computing environment 602 includes application servers 608, data storage 610, and one or more network interfaces 612. According to various implementations, the functionality of the application servers 608 can be provided by one or more server computers that are executing as part of, or in communication with, the network 604. The application servers 608 can host various services, virtual machines, portals, and/or other resources. In the illustrated configuration, the application servers 608 host one or more virtual machines 614 for hosting applications or other functionality. According to various implementations, the virtual machines 614 host one or more applications and/or software modules for enabling prediction of vulnerability of network resources. It should be understood that this configuration is illustrative, and should not be construed as being limiting in any way. The application servers 608 also host or provide access to one or more portals, link pages, Web sites, and/or other information ("Web portals") 616.

According to various implementations, the application servers 608 also include one or more mailbox services 618 and one or more messaging services 620. The mailbox services 618 can include electronic mail ("email") services. The mailbox services 618 also can include various personal information management ("PIM") and presence services including, but not limited to, calendar services, contact management services, collaboration services, and/or other services. The messaging services 620 can include, but are not limited to, instant messaging services, chat services, forum services, and/or other communication services.

The application servers 608 also may include one or more social networking services 622. The social networking services 622 can include various social networking services including, but not limited to, services for sharing or posting status updates, instant messages, links, photos, videos, and/or other information; services for commenting or displaying interest in articles, products, blogs, or other resources; and/or other services. In some configurations, the social networking services 622 are provided by or include the FACEBOOK social networking service, the LINKEDIN professional networking service, the FOURSQUARE geographic networking service, and the like. In other configurations, the social networking services 622 are provided by other services, sites, and/or providers that may or may not be explicitly known as social networking providers. For example, some web sites allow users to interact with one another via email, chat services, and/or other means during various activities and/or contexts such as reading published articles, commenting on goods or services, publishing, collaboration, gaming, and the like. Examples of such services include, but are not limited to, the WINDOWS LIVE service and the XBOX LIVE service from Microsoft Corporation in Redmond, Wash. Other services are possible and are contemplated.

The social networking services 622 also can include commenting, blogging, and/or micro blogging services. Examples of such services include, but are not limited to, the YELP commenting service, the TWITTER messaging service, and/or other services. It should be appreciated that the above lists of services are not exhaustive and that numerous additional and/or alternative social networking services 622 are not mentioned herein for the sake of brevity. As such, the above configurations are illustrative, and should not be construed as being limited in any way. According to various implementations, the social networking services 622 may host one or more applications and/or software modules for providing the functionality described herein, such as enabling smart versioning of files. For instance, any one of the application servers 608 may communicate or facilitate the functionality and features described herein. For instance, a social networking application, mail client, messaging client or a browser running on a phone or any other client 606 may communicate with a networking service 622 and facilitate the functionality, even in part, described above with respect to FIG. 6. Any device or service depicted herein can be used as a resource for supplemental data, including email servers, storage servers, etc.

As shown in FIG. 6, the application servers 608 also can host other services, applications, portals, and/or other resources ("other resources") 624. The other resources 624 can include, but are not limited to, document sharing, rendering or any other functionality. It thus can be appreciated that the computing environment 602 can provide integration of the concepts and technologies disclosed herein with various mailbox, messaging, social networking, and/or other services or resources.

As mentioned above, the computing environment 602 can include the data storage 610. According to various implementations, the functionality of the data storage 610 is provided by one or more databases operating on, or in communication with, the network 604. The functionality of the data storage 610 also can be provided by one or more server computers configured to host data for the computing environment 602. The data storage 610 can include, host, or provide one or more real or virtual datastores 626A-626N (hereinafter referred to collectively and/or generically as "datastores 626"). The datastores 626 are configured to host data used or created by the application servers 608 and/or other data. Although not illustrated in FIG. 6, the datastores 626 also can host or store web page documents, word documents, presentation documents, data structures, algorithms for execution by a recommendation engine, and/or other data utilized by any application program or another module. Aspects of the datastores 626 may be associated with a service for storing files.

The computing environment 602 can communicate with, or be accessed by, the network interfaces 612. The network interfaces 612 can include various types of network hardware and software for supporting communications between two or more computing devices including, but not limited to, the computing devices and the servers. It should be appreciated that the network interfaces 612 also may be utilized to connect to other types of networks and/or computer systems.

It should be understood that the distributed computing environment 600 described herein can provide any aspects of the software elements described herein with any number of virtual computing resources and/or other distributed computing functionality that can be configured to execute any aspects of the software components disclosed herein. According to various implementations of the concepts and technologies disclosed herein, the distributed computing environment 600 provides the software functionality described herein as a service to the computing devices. It should be understood that the computing devices can include real or virtual machines including, but not limited to, server computers, web servers, personal computers, mobile computing devices, smart phones, and/or other devices. As such, various configurations of the concepts and technologies disclosed herein enable any device configured to access the distributed computing environment 600 to utilize the functionality described herein for providing the techniques disclosed herein, among other aspects.

The disclosure set forth herein also encompasses the subject matter set forth in the following clauses:

Clause 1. A system comprising: one or more processing units; and a computer-readable storage medium having computer-executable instructions stored thereupon, which, when executed by the one or more processing units, cause the one or more processing units to generate an initial vulnerability score for each of a plurality of network resources; collect activity data from the plurality of network resources; build a vulnerability model based on the initial vulnerability scores and the activity data collected from the plurality of network resources; obtain new activity data of the network resources; generate predicted vulnerability scores for the plurality of network resources by applying the new activity data to the vulnerability model; identify at least one vulnerable network resource from the plurality of network resources based on the predicted vulnerability scores; and cause one or more actions to be performed to increase security of the at least one vulnerable network resource.

Clause 2. The system of clause 1, wherein the activity data of the network resources comprise one or more of network traffic data associated with the network resource, or data describing activities occurring on the network resources.

Clause 3. The system of clauses 1 or 2, wherein the computer-readable storage medium has further computer-executable instructions stored thereon which, when executed by the one or more processing units, cause the one or more processing units to access configuration data of the plurality of network resources, and wherein the initial vulnerability scores for the plurality of network resource is generated based on the configuration data of a corresponding network resource.

Clause 4. The system of any of clauses 1-3, wherein the one or more actions comprise causing the vulnerable network resource to be turned off, causing the vulnerable network resource to be taken offline, sending a warning to an administrator of the at least one vulnerable network resource, or causing the vulnerable network resource to be reconfigured to increase its security.

Clause 5. The system of any of clauses 1-4, wherein the computer-readable storage medium has further computer-executable instructions stored thereon which, when executed by the one or more processing units, cause the one or more processing units to: identify activity patterns that are unique to the at least one vulnerable network resource as attack patterns; and inform a user of the at least one vulnerable network resource about the attack patterns.

Clause 6. The system of any of clauses 1-5, wherein building the vulnerability model comprises: extracting one or more activity features from the activity data of the plurality of network resources; and performing supervised training on a machine-learning model based on the one or more activity features and the initial vulnerability scores.

Clause 7. The system of any of clauses 1-7, wherein the machine-learning model is an artificial neural network model.

Clause 8. A computer-readable storage medium having computer-executable instructions stored thereon which, when executed by one or more processing units of a computing device, cause the one or more processing units to: generate an initial vulnerability score for each of a plurality of network resources; collect activity data from the plurality of network resources; train a vulnerability model based on the initial vulnerability scores and the activity data collected from the plurality of network resources; obtain new activity data of the network resources; generate a predicted vulnerability score for each of the plurality of network resources by applying the new activity data to the vulnerability model; identify one or more vulnerable network resources from the plurality of network resources based on the predicted vulnerability scores; and cause one or more actions to be performed on the one or more vulnerable network resources to increase security of the one or more vulnerable network resources.

Clause 9. The computer-readable storage medium of clause 8, having further computer-executable instructions stored thereon which, when executed by the one or more processing units, cause the one or more processing units to: identify activity patterns that are unique to the one or more vulnerable network resources as attack patterns; and inform a user of the one or more vulnerable network resources about the attack patterns.

Clause 10. The computer-readable storage medium of clauses 8 or 9, having further computer-executable instructions stored thereon which, when executed by the one or more processing units, cause the one or more processing units to access configuration data of the plurality of network resources, wherein the initial vulnerability scores for the plurality of network resource is generated based on the configuration data of the corresponding network resource.

Clause 11. The computer-readable storage medium of any of clauses 8-10, wherein the activity data of the network resources comprise one or more of network traffic data associated with the network resource, or activities occurred on the network resources.

Clause 12. The computer-readable storage medium of any of clauses 8-11, wherein the one or more actions comprise causing the one or more vulnerable network resources to be turned off, causing the vulnerable network resources to be taken offline, sending a warning to a user of the one or more vulnerable network resources, or causing the one or more vulnerable network resources to be reconfigured to increase its security.

Clause 13. The computer-readable storage medium of any of clauses 8-12, wherein training the vulnerability model comprises: extracting one or more activity features from the activity data of the plurality of network resources; and performing supervised training on a machine-learning model based on the one or more activity features and the initial vulnerability scores.

Clause 14. The computer-readable storage medium of any of clauses 8-13, the machine-learning model is an artificial neural network model.

Clause 15. A computer-implemented method for detecting network attacks and vulnerable network resources, the method comprising: accessing configuration data of one or more network resources; generating an initial vulnerability score for each of one or more network resources based at least in part upon the configuration data of the network resources; accessing activity data from the network resources; building a vulnerability model based on the initial vulnerability scores and the activity data of the network resources; obtaining new activity data of the network resources; generating, using the vulnerability model, a predicted vulnerability score for each of the one or more network resources based on the new activity data; identifying at least one vulnerable network resource based on the predicted vulnerability score; and causing one or more actions to be performed to increase security of the at least one vulnerable network resource.

Clause 16. The computer-implemented method of clause 15, wherein the activity data of the network resources comprise one or more of network traffic data associated with the network resources, or activities occurred on the network resources.

Clause 17. The computer-implemented method of clauses 15 or 16, wherein the one or more actions comprise causing the at least one vulnerable network resource to be turned off, causing the at least one vulnerable network resource to be taken offline, sending a warning to a user of the at least one vulnerable network resource, or causing the at least one vulnerable network resource to be reconfigured to increase its security.

Clause 18. The computer-implemented method of any of clauses 15-17, further comprising: identifying activity patterns that are unique to the at least one vulnerable network resource as attack patterns; and informing a user of the at least one vulnerable network resource about the attack patterns.

Clause 19. The computer-implemented method of any of clauses 15-18, wherein building the vulnerability model comprises: extracting one or more activity features from the activity data of the network resources; and performing supervised training on a machine-learning model based on the one or more activity features and the initial vulnerability scores.

Clause 20. The computer-implemented method of any of clauses 15-19, wherein the machine-learning model is an artificial neural network model.

In closing, although the various configurations have been described in language specific to structural features and/or methodological acts, it is to be understood that the subject matter defined in the appended representations is not necessarily limited to the specific features or acts described. Rather, the specific features and acts are disclosed as example forms of implementing the claimed subject matter.

What is claimed is:
1. A system comprising:
one or more processing units; and
a computer-readable storage medium having computer-executable instructions stored thereupon, which, when executed by the one or more processing units, cause the one or more processing units to
access security configuration data for each of a plurality of network resources, wherein the security configuration data includes at least one of a setup of a firewall, a strength of a user password, or a number of users of a corresponding network resource;
generate an initial vulnerability score for each of the plurality of network resources based solely on the security configuration data of a corresponding network resource, wherein the initial vulnerability score for each of the plurality of network resources is below a threshold vulnerability score established to identify a virtual honeypot;
collect activity data from the plurality of network resources during a first period of time;
build a vulnerability model based on the initial vulnerability scores and the activity data collected from the plurality of network resources during the first period of time;
collect new activity data for the plurality of network resources during a second period of time that occurs after the first period of time;

generate predicted vulnerability scores for the plurality of network resources by applying the new activity data to the vulnerability model;

identify at least one vulnerable network resource, from the plurality of network resources, that has a predicted vulnerability score that exceeds the threshold vulnerability score established to identify the virtual honeypot; and analyze an activity pattern that is unique to the at least one vulnerable network resource to determine that the activity pattern is associated with an attack pattern used by a malicious entity.

2. The system of claim 1, wherein the activity data collected from the plurality of network resources comprises network traffic data.

3. The system of claim 1, wherein the computer-readable storage medium has further computer-executable instructions stored thereon which, when executed by the one or more processing units, cause the one or more processing units to cause one or more actions to be performed to increase security of the at least one vulnerable network resource, wherein the one or more actions comprise causing the at least one vulnerable network resource to be turned off, causing the at least one vulnerable network resource to be taken offline, sending a warning to an administrator of the at least one vulnerable network resource, or causing the at least one vulnerable network resource to be reconfigured to increase its security.

4. The system of claim 1, wherein the computer-readable storage medium has further computer-executable instructions stored thereon which, when executed by the one or more processing units, cause the one or more processing units to:

inform a user of the at least one vulnerable network resource about the attack pattern.

5. The system of claim 1, wherein building the vulnerability model comprises:

extracting one or more activity features from the activity data of the plurality of network resources; and performing supervised training on a machine-learning model based on the one or more activity features and the initial vulnerability scores.

6. The system of claim 5, wherein the machine-learning model is an artificial neural network model.

7. A computer-readable storage medium having computer-executable instructions stored thereon which, when executed by one or more processing units of a computing device, cause the one or more processing units to:

access security configuration data for each of a plurality of network resources, wherein the security configuration data includes at least one of a setup of a firewall, a strength of a user password, or a number of users of a corresponding network resource;

generate an initial vulnerability score for each of the plurality of network resources based solely on the security configuration data of a corresponding network resource, wherein the initial vulnerability score for each of the plurality of network resources is below a threshold vulnerability score established to identify a virtual honeypot;

collect activity data from the plurality of network resources during a first period of time;

train a vulnerability model based on the initial vulnerability scores and the activity data collected from the plurality of network resources during the first period of time;

collect new activity data for the plurality of network resources during a second period of time that occurs after the first period of time;

generate a predicted vulnerability score for each of the plurality of network resources by applying the new activity data to the vulnerability model;

identify a vulnerable network resource, from the plurality of network resources, that has a predicted vulnerability score that exceeds the threshold vulnerability score established to identify the virtual honeypot; and analyze an activity pattern that is unique to the vulnerable network resource to determine that the activity pattern is associated with an attack pattern used by a malicious entity.

8. The computer-readable storage medium of claim 7, having further computer-executable instructions stored thereon which, when executed by the one or more processing units, cause the one or more processing units to:

inform a user of the vulnerable network resource about the attack pattern.

9. The computer-readable storage medium of claim 7, wherein the activity data collected from the plurality of network resources comprises network traffic data.

10. The computer-readable storage medium of claim 7, having further computer-executable instructions stored thereon which, when executed by the one or more processing units, cause the one or more processing units to cause one or more actions to be performed to increase security of the vulnerable network resource, wherein the one or more actions comprise causing the vulnerable network resource to be turned off, causing the vulnerable network resource to be taken offline, sending a warning to a user of the vulnerable network resource, or causing the vulnerable network resource to be reconfigured to increase its security.

11. The computer-readable storage medium of claim 7, wherein training the vulnerability model comprises:

extracting one or more activity features from the activity data of the plurality of network resources; and performing supervised training on a machine-learning model based on the one or more activity features and the initial vulnerability scores.

12. The computer-readable storage medium of claim 11, wherein the machine-learning model is an artificial neural network model.

13. A computer-implemented method for detecting network attacks and vulnerable network resources, the method comprising:

accessing security configuration data of a plurality of network resources, wherein the security configuration data includes at least one of a setup of a firewall, a strength of a user password, or a number of users of a corresponding network resource;

generating an initial vulnerability score for each of the plurality of network resources based solely upon the security configuration data of a corresponding network resource, wherein the initial vulnerability score for each of the plurality of network resources is below a threshold vulnerability score established to identify a virtual honeypot;

accessing activity data from the plurality of network resources during a first period of time;

building a vulnerability model based on the initial vulnerability scores and the activity data of the network resources;

obtaining new activity data for the plurality of network resources during a second period of time that occurs after the first period of time;

generating, using the vulnerability model, a predicted vulnerability score for each of the plurality of network resources based on the new activity data;

identifying at least one vulnerable network resource, from the plurality of network resources, that has a predicted vulnerability score that exceeds the threshold vulnerability score established to identify the virtual honeypot; and analyzing an activity pattern that is unique to the at least one vulnerable network resource to determine that the activity pattern is associated with an attack pattern used by a malicious entity.

14. The computer-implemented method of claim 13, wherein the activity data of the plurality of network resources comprises network traffic data.

15. The computer-implemented method of claim 13, further comprising causing one or more actions to be performed to increase security of the at least one vulnerable network resource, wherein the one or more actions comprise causing the at least one vulnerable network resource to be turned off, causing the at least one vulnerable network resource to be taken offline, sending a warning to a user of the at least one vulnerable network resource, or causing the at least one vulnerable network resource to be reconfigured to increase its security.

16. The computer-implemented method of claim 13, further comprising:
informing a user of the at least one vulnerable network resource about the attack pattern.

17. The computer-implemented method of claim 13, wherein building the vulnerability model comprises:
extracting one or more activity features from the activity data of the plurality of network resources; and
performing supervised training on a machine-learning model based on the one or more activity features and the initial vulnerability scores.

18. The computer-implemented method of claim 17, wherein the machine-learning model is an artificial neural network model.

19. The system of claim 1, wherein the computer-readable storage medium has further computer-executable instructions stored thereon which, when executed by the one or more processing units, cause the one or more processing units to compare first activity data for the at least one vulnerable network resource to second activity data for one or more non-vulnerable network resources to identify the activity pattern that is unique to the at least one vulnerable network resource.

20. The computer-implemented method of claim 13, further comprising comparing first activity data for the at least one vulnerable network resource to second activity data for one or more non-vulnerable network resources to identify the activity pattern that is unique to the at least one vulnerable network resource.

* * * * *